Figure 1:
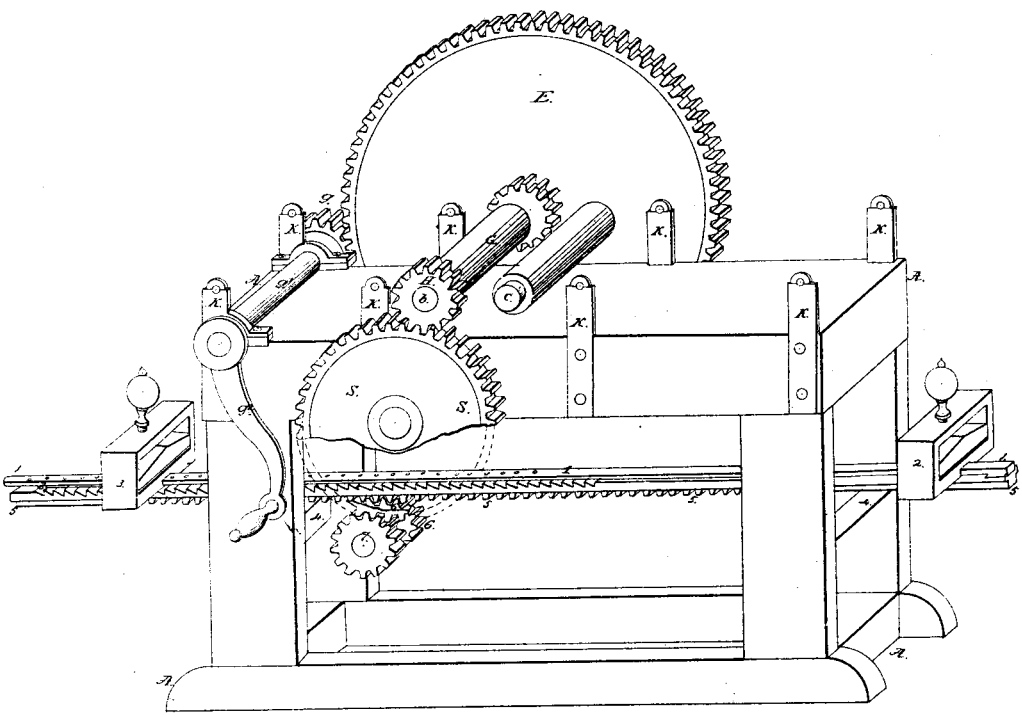
Figure 2:
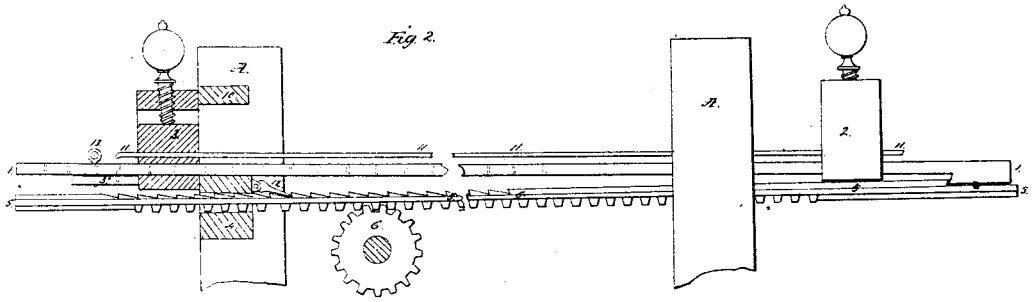

B. Rowe,

Splitting Leather.

No. 96, A.1. Patented Sep. 10, 1850.

N. PETERS, PHOTO-LITHOGRAPHER, WASHINGTON, D. C.

DEPARTMENT OF COMMERCE
UNITED STATES PATENT AND TRADEMARK OFFICE

---

MISSING PAGE(S)

PATENT NUMBER AI 96 FOR THE ISSUE DATE 09/10/1850 HAS BEEN SCANNED/LOADED, BUT WITH MISSING PAGES(S). UPON RECEIPT OF THE MISSING PAGE(S), THE ENTIRE DOCUMENT WILL BE RESCANNED.

THIS NOTICE IS FOR THE MISSING PAGE(S) CONTAINING:

All Text

No. 96.—*Improvements in Apparatus for Splitting and Stretching Leather.*

I claim the improvement of the apparatus for splitting and stretching leather, secured to me by letters patent, in April 1850, by adding thereto an additional apparatus for stretching leather, especially belting, said apparatus consisting of the combination of two rods, placed one above the other, in juxtaposition, the upper rod maintaining two clamps to hold the leather to be operated on, the one clamp fixed to one end of the rod, the other clamp moveable along the rod. The said rod being separable from the machine with the leather, after the same has been stretched, for the purpose of allowing the repetition of the stretching operations, with another similar rod, and another piece of leather.

The under rod to be a permanent attachment to the machine, but moveable along its own length, by the wheel work of the machine, or otherwise, so that when the upper rod is temporarily secured to it by one end near the fixed clamp, and the other clamp is held in its position, the two clamps may be gradually separated, stretching the leather lying between them, substantially as set forth in the above specification.

BRADFORD ROWE.